United States Patent [19]

Rosten

[11] Patent Number: 4,602,755
[45] Date of Patent: Jul. 29, 1986

[54] HOSPITAL-BED PHONE MOUNTING PLATE

[76] Inventor: William J. Rosten, 13527 Filmore St., Pacoima, Calif. 91331

[21] Appl. No.: 765,666

[22] Filed: Aug. 15, 1985

[51] Int. Cl.⁴ .............................................. E04G 5/06
[52] U.S. Cl. ...................................... 248/214; 5/508
[58] Field of Search ............... 248/214, 215, 309.1, 248/222.4, 223.1, 223.2; 5/508, 507, 503, 509; 179/146 R, 154, 157, 155, 153

[56] References Cited

U.S. PATENT DOCUMENTS

| | | | |
|---|---|---|---|
| 1,132,082 | 3/1915 | Frost | 254/242 |
| 2,610,998 | 9/1952 | Lockhart | 248/222.4 X |
| 2,913,740 | 11/1959 | Eldridge | 5/503 |
| 3,189,308 | 6/1965 | Schaefer | 248/214 |
| 3,345,023 | 10/1967 | Scott et al. | 5/503 X |
| 3,398,244 | 8/1968 | Ertl et al. | 179/146 R |
| 3,898,394 | 8/1975 | Ward et al. | 179/146 R |
| 4,368,359 | 1/1983 | Genaro et al. | 179/146 R |
| 4,369,340 | 1/1983 | Beatenbough | 179/146 R |
| 4,431,154 | 2/1984 | Hamm | 5/503 X |
| 4,432,522 | 2/1984 | Pruente et al. | 5/503 X |

Primary Examiner—J. Franklin Foss
Attorney, Agent, or Firm—Milton S. Gerstein

[57] ABSTRACT

A hospital-bed, phone mounting plate that permits swinging movement of a wall-type phone mounted thereto in a vertical plane, so that as the head of the bed is raised or lowered, the wall phone will remain continuously in a vertical plane even though the phone-mounting plate is pivoted along with the head portion of the bed. Adjustable clamp mounts the plate to a top rail of the hospital bed. Spacers at the four corners of the mounting plate are used to wrap phone excess phone wire.

13 Claims, 7 Drawing Figures

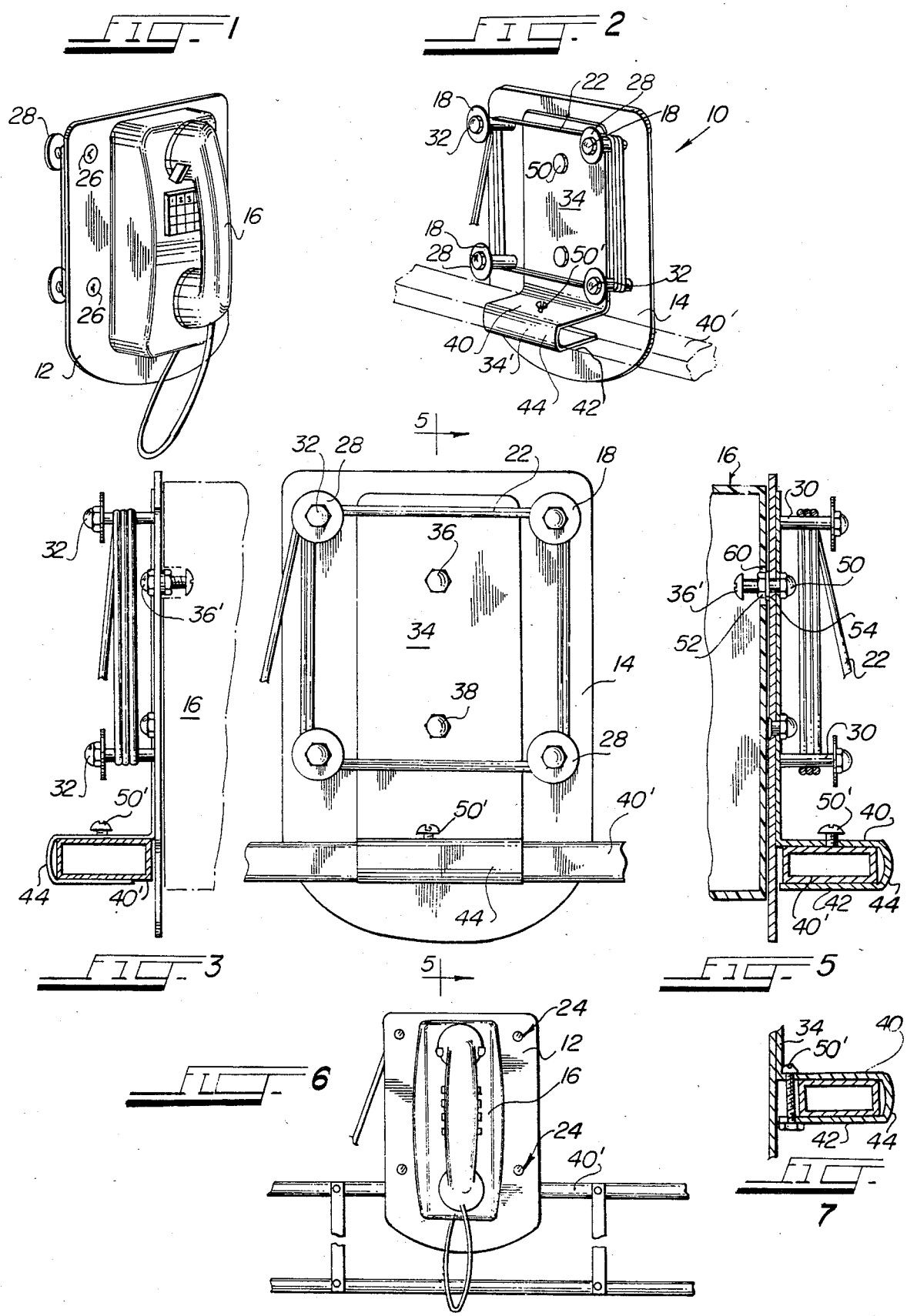

HOSPITAL-BED PHONE MOUNTING PLATE

BACKGROUND OF THE INVENTION

The present invention is directed to a wall-type phone mounting plate for a hospital bed, which attaches a phone to the top rail of the hospital bed, so that a patient may have ready and easy access to a phone while lying or sitting in bed.

Phone mounting plates for hospital beds are known, but all suffer from the disadvantage of not compensating for the lifting movement of the head portion of the bed, to which the phone is usually secured. As the head portion of the bed is raised or lowered, the phone mounted thereto by a bracket, or the like, is moved along with the head portion, such that it no longer may keep its vertical orientation. This can cause the receiver of the phone to fall off its catch, if the bed is lifted too much.

SUMMARY OF THE INVENTION

It is, therefore, the primary objective of the present invention to provide a phone-mounting plate that is easily and readily attachable to the top rail of the hospital bed, such that during movement of the head portion of the bed, the phone remains at all time in a vertical plane.

It is another objective of the present invention to provide a hospital-bed, phone mounting plate that allows the rear cut-out of a wall-type phone to be slipped thereon in fast and simple manner.

It is still another objective of the present invention to provide a hospital-bed phone mounting plate that allows the excess phone wire to be stored thereon, to prevent accidents and inconvenience.

Toward these and other ends, the phone mounting plate of the present invention is made of a main portion that has a projecting pin which receives the cut-out of the wall-type phone. The pin has an enlarged head, constituted by the head of a screw, that holds the phone thereto by insertion into the rear cut-out of the wall-type phone. A lower U-shaped clamp mounts the plate to a top rail of a hospital bed, so that the phone and mounting plate project substantially thereabove. Each corner of the main portion of the mounting plate is provided with spacer-sleeves about which are wound excess phone wire. In the preferred embodiment, the spacer-sleeves project from the rear surface of the plate facing away from the patient, while the projecting pin projects toward the patient from the front surface of the plate. The projecting pin has an adjustable space to allow tight fitting of the head of the screw in differently-sized and shaped rear cut-outs of the wall-type phone.

BRIEF DESCRIPTION OF THE DRAWING

The invention will be more readily understood with reference to the accompanying drawing, wherein FIG. 1 is a perspective view showing a wall-type phone mounted to the front surface of the mounting plate of the present invention;

FIG. 2 is a perspective view showing the rear surface of the mounting plate of the present invention with a rail of a hospital bed inserted into the clamp holding the mounting plate thereto;

FIG. 3 is a side, elevational view of the mounting plate of the present invention mounted to a rail of a hospital bed with a wall-type phone attached thereto;

FIG. 4 is a rear view of the mounting plate of the present invention;

FIG. 5 is a cross-sectional view taken along line 5—5 of FIG. 4;

FIG. 6 is a front view of the mounting plate of the present invention attached to an upper rail of a hospital bed, with a wall-type phone secured thereto, and FIG. 7 is a cross-sectional view showing the preferred securing bolt holding the plate to the rail of a bed.

DETAILED DESCRIPTION OF THE INVENTION

Referring now to the drawing in greater detail, the hospital-bed phone mounting bracket is indicated generally by reference numeral 10. The mounting bracket has a front surface 12 upon which is mounted a wall-type phone 16, and a rear surface 14 upon which are provided four, corner spacer elements 18 about which is wrapped the phone wire 22 in the manner shown in FIGS. 2 and 4. Each spacer element 18 includes an elongated bolt 24 having enlarged head portion 26, over which is telescopingly mounted a large-diameter washer 28, and spacer sleeve 30. The spacer sleeve 30 and washer 28 are firmly secured to the bolt 24 via end nut 32.

Also attached to the rear surface 14 is an attaching bracket or plate 34 firmly secured to the rear surface via a first, upper bolt 36, which serves also to mount the phone to the front surface 12 in the manner to be described. A second, lower bolt 38 clamps the lower portion of the plate 34 tightly, but is adjustable to allow the pivoting of the lower portion 34' of the plate 34 relative to the top portion secured by the bolt 36. The lower portion 34' is a U-shaped clamping member having upper leg portion 40 and lower leg portion 42, with the connecting base 44 interconnecting the outer edge surfaces of the two leg portions, as clearly shown in FIGS. 2 and 3.

The lower leg portion 42 is shorter in length than the upper leg portion 40, so that a rail 40' of a hospital bed may be more easily placed therein for mounting the mounting bracket 10 to the upper rail of a hospital bed. However, the two legs may be of the same length. In one embodiment, the rail is secured to the U-shaped clamp by a simple screw extending through one hole in the lower leg portion 42, or in the preferred embodiment shown in FIG. 7, by a clamping bolt 50 drawing together the two nearer ends of the leg portions 40 and 42, with the appropriate nut and washer on one end. In the preferred embodiment, the legs portions 40 and 42 are of greater length than the width of a rail 40' to be positioned therein, so that the clamping bolt 50 may join the two ends of the legs. Owing to the rectangular cross-sectional shape of the rail, no rotation about the legs is possible. However, nonrectilinear shape cross-sectional rails may also be accomodated by the use of a simple screw extending through a hole in one or both of the leg portions 40 and 42, and urged against the rail itself. Other well-known fastening means may be used as well.

To mount the mounting bracket 10 to a rail 40', the bolt 38 need only be loosened to allow bending of the lower plate portion 34' relative to the rear surface, during which the rail is inserted between the leg portions 40 and 42.

Projecting from the front surface 12 is the shank portion of the bolt 36, which is used to mount the wall-type phone to the mounting plate 10. The bolt 36 has a head portion best seen in FIG. 5, which projects a certain distance away from the plane of the front surface 12. The bolt or screw 36 is secured in place by a cap nut 50 on the rear surface 14. A nut 52 and washer 54 are also provided on the front surface-side about the shank of the bolt 36, which nut and washer provide an adjustable spacing between the head portion 50 and the plane of the front surface 12, so that the cut-out 60 of the rear surface of the phone 16 may be received in the space between head portion 50 and nut 52, to thereby suspend the phone thereby along the front surface and parallel thereto. The suspension is such that when the head of the hospital bed is lifted or lowered, the phone is allowed to freely pivot about the shank of the bolt 36, so that it always remains vertically oriented. The nut 52 may be adjusted along the shank to provide the precise distance between the nut and head portion 50 to fit any type of wall-type phone made. Alternatively, the screw 36 may be rotated itself to provide such adjustment.

While a specific embodiment of the invention has been shown and described, it is to be understood that numerous changes and modifications thereof may be made without departing from the scope, spirit, and intent of the invention as set out in the appended claims. For example, the screw or bolt 50 of FIG. 7 may also be provided with a pair of spacers about the shaft of the bolt so that during tightening the legs 40 and 42 are are held more firmly to the bed rail. Further, for those hospital beds where the rails do not extend in a true vertical orientation, the plate 34 may be bent via a brake to extend at less than a right angle relative to the leg 40, which angle is chosen to adjust to the angular orientation of the bed rails, such that the phone will itself extend in a substantial vertical plane of orientation.

What is claimed is:

1. A hospital-bed phone mounting plate comprising:
   a main bracket means for mounting parts thereto;
   a rail-attaching means fixedly connected to said main bracket means for attaching said bracket means to the rail of a hospital bed, said rail-attaching means comprising a main body portion connected to said main bracket means along a portion of each, and a clamping member for mounting therein a rail of the hospital bed to which the mounting plate is attached for mounting a phone thereto; said main body portion having at least one securing means positioned above said clamping member for connecting said main body portion to said main bracket means;
   means for holding said clamping member to a rail of a hospital bed when the plate is mounted to the hospital bed;
   a projecting phone-mounting pin member having an enlarged head at an end thereof, said projecting pin member being receivable in the rear, cut-out portion of a conventional wall-type phone for mounting the wall phone to the plate, such that the phone is free to swing in a vertical plane as the head of the bed is pivoted upwardly or downwardly so that the phone remains vertically oriented for all movements of the head of the bed; said projecting pin member projecting from said main bracket means, said enlarged head projecting outwardly from the surface of said main bracket means facing away from said main body portion, such that said enlarged head is spaced from said surface.

2. The mounting plate according to claim 1, wherein said surface faces toward the hospital bed when the plate is mounted to a rail thereof; said main body portion further comprising a plurality of projecting sleeve members about which may be wrapped the phone-connecting wire; said sleeve members being mounted to said surface.

3. The mounting plate according to claim 2, wherein said plurality of sleeve members are four in number, one said projecting sleeve member for each corner of said surface of said elongated portion. projects therefrom.

4. The mounting plate according to claim 3, wherein each of said projecting sleeve members comprises a substantially hollow cylindrical portion determining the spacing from said surface, a screw member insertable through said cylindrical portion, an enlarged disc member having an outer diameter substantially greater than the diameter of said cylindrical portion, and a nut for holding said enlarged disc member on the end of said screw member, such that the space between said enlarged disc member and said surface constitutes the volume about which the phonewire is wound about said cylindrical portion.

5. The mounting plate according to claim 1, wherein said means for holding comprises a U-shaped clamping member having a screw insertable through each leg of said U-shaped member, each of said legs having a cooperating hole for receiving therethrough said screw, said holes of said legs being formed adjacent said surface of said main bracket, whereby a rail of the hospital bed may be inserted in said member such that the end edge thereof is positioned away from said holes of said legs, whereby said screw may draw said legs together to hold tight the plate to the rail.

6. The mounting plate according to claim 5, wherein a lower leg of said clamping member is shorter than upper leg, so that the rail of the hospital bed may be easily inserted into the U-shaped clamping member.

7. The mounting plate according to claim 1, wherein said projecting pin member also passes through a hole formed in said main body portion in alignment with a hole of said main bracket means, said projecting pin member being a threaded screw; said enlarged head being constituted by the head of the screw; said projecting pin member also comprising means added to the opposite end of said screw for fixably mounting said screw.

8. The mounting plate according to claim 7, wherein said projecting pin member further comprises a nut located adjacent to said head of said screw whereby the distance between said head and said nut may be varied.

9. The mounting plate according to claim 7, wherein said screw lies substantially coplaner with said at least one securing means for uniting said main bracket means with said main body portion; said screw being vertically elevated as compared with said at least one securing means when said mounting plate is mounted to a rail of a bed.

10. A hospital-bed phone mounting plate comprising:
    a mounting bracket having a front surface and a rear surface;
    rail-attaching means fixedly connected to a portion of said mounting bracket at said rear surface, said rail-attaching means comprising means for fixedly securing said mounting bracket to a rail;

means connected with said mounting bracket for mounting a wall-type phone comprising a head portion spaced from said front surface by which a cut out on the rear surface of a wall-type phone may be mounted;

said mounting bracket comprising four sleeve members, each said sleeve member being mounted proximate to a corner of said mounting bracket and comprising a hollow cylindrical portion, a screw member insertable through said hollow cylindrical portion, an enlarged disc member having an outer diameter greater than the diameter of said cylindrical portion, and means for holding said disc member on the end of said screw member, the spaced between said disc member and the adjacent surface of said mounting bracket constituting a volume about which wire may be wound in conjunction with the other ones of said projecting sleeve members.

11. The mounting plate according to claim 10, wherein said hollow cylindrical portions project from said rear surface of said mounting bracket.

12. The mounting plate according to claim 10, wherein means for mounting comprises a nut mounted adjacent to said front surface and spaced from said head portion, on the same side of said front surface, whereby the space between said nut and said head portion may be adjustable to fit variously sized cut outs of a wall-type phone.

13. A hospital-bed phone-mounting plate, comprising:

a main bracket comprising a main body portion having a front surface and a rear surface;

means for mounting said main bracket to a rail of a bed so that said main bracket is held thereby from movement;

a projecting pin member projecting from said front surface of said main body portion having a first end fixedly connected to said main body portion, and a second end spaced from said front surface; said second end of said pin member comprising an enlarged head portion for insertion into the cutout of the rear surface of a wall-type phone, whereby the phone is free to pivot in a vertical plane for all movements of the head of the bed, so as to ensure that the phone always remains vertically-oriented, and a wall-type telephone having a rear cutout portion formed in the upper rear surface thereof, said enlarged head portion of said pin member being received in said rear cutout portion for free pivotal movement of said telephone thereby such that for all movements of said main bracket said telephone remains always vertically-oriented, said telephone being mounted parallel to and directly adjacent to said front surface.

* * * * *